United States Patent
Chifor et al.

(10) Patent No.: US 11,595,367 B2
(45) Date of Patent: Feb. 28, 2023

(54) SELECTIVELY DISCLOSING CONTENT OF DATA CENTER INTERCONNECT ENCRYPTED LINKS

(71) Applicant: LENOVO Enterprise Solutions (Singapore) PTE. LTD., New Tech Park (SG)

(72) Inventors: Bogdan Chifor, Nojorid (RO); George-Andrei Stanescu, Ilfov (RO); Radu Iorga, Bucharest (RO); Corneliu-Ilie Calciu, Bucharest (RO)

(73) Assignee: LENOVO Enterprise Solutions (Singapore) PTE. LTD., New Tech Park (SG)

( * ) Notice: Subject to any disclaimer, the term of this patent is extended or adjusted under 35 U.S.C. 154(b) by 233 days.

(21) Appl. No.: 17/039,397

(22) Filed: Sep. 30, 2020

(65) Prior Publication Data
US 2022/0103535 A1  Mar. 31, 2022

(51) Int. Cl.
H04L 29/06 (2006.01)
H04L 9/40 (2022.01)
H04L 9/14 (2006.01)

(52) U.S. Cl.
CPC ............ H04L 63/0485 (2013.01); H04L 9/14 (2013.01)

(58) Field of Classification Search
CPC ..... H04L 63/0485; H04L 9/14; H04L 63/061; H04L 9/0819
See application file for complete search history.

(56) References Cited

U.S. PATENT DOCUMENTS

| | | | |
|---|---|---|---|
| 6,363,480 B1* | 3/2002 | Perlman | H04L 9/088 713/165 |
| 6,567,914 B1* | 5/2003 | Just | H04L 9/0819 380/278 |
| 7,000,120 B1* | 2/2006 | Koodli | H04L 69/22 713/153 |

(Continued)

OTHER PUBLICATIONS

Sabrina Dubroca, MACsec: a different solution to encrypt network traffic, Red Hat Developer, Oct. 14, 2016, pp. 1-17.

(Continued)

*Primary Examiner* — Saleh Najjar
*Assistant Examiner* — Khalid M Almaghayreh
(74) *Attorney, Agent, or Firm* — Kunzler Bean & Adamson; Bruce R. Needham

(57) ABSTRACT

An apparatus includes a packet encryption circuit that uses an encryption keys to encrypt each of two or more portions of a data packet. Each portion is encrypted with a different encryption key and includes one or more layers of the data packet. A first portion includes a layer of the data packet with MAC information. The apparatus includes a packet transmitter that transmits, from a source router, an encrypted data packet to an intermediate router between the source router and a destination router. The encrypted data packet includes an encrypted version of the data packet encrypted using the encryption keys. The intermediate router has encryption keys sufficient for a service level agreement of the intermediate router and lacks a portion of the encryption keys. The source and destination routers use a MAC security standard for encryption and decryption of the data packet using the encryption keys.

20 Claims, 11 Drawing Sheets

(56) References Cited

U.S. PATENT DOCUMENTS

| | | | |
|---|---|---|---|
| 9,882,714 B1* | 1/2018 | Cignetti | H04L 9/083 |
| 10,554,637 B1* | 2/2020 | Bendersky | H04L 9/085 |
| 2008/0021834 A1* | 1/2008 | Holla | G16H 80/00 705/51 |
| 2009/0249490 A1* | 10/2009 | Umesawa | H04L 67/1076 726/26 |
| 2009/0282250 A1* | 11/2009 | Sato | H04L 9/083 713/171 |
| 2012/0144188 A1* | 6/2012 | Agostani | H04L 61/25 713/153 |
| 2014/0348000 A1* | 11/2014 | Izu | H04W 40/24 370/236 |
| 2015/0381657 A1* | 12/2015 | Kelson | H04L 63/0281 713/153 |
| 2016/0119294 A1* | 4/2016 | Petach | H04L 63/0428 709/224 |
| 2016/0241389 A1* | 8/2016 | Le Saint | H04L 9/0844 |
| 2018/0052731 A1* | 2/2018 | Grube | H04L 67/10 |
| 2018/0219913 A1* | 8/2018 | Manasse | G06F 9/45558 |
| 2018/0309739 A1* | 10/2018 | Kumhyr | G06F 21/6218 |
| 2018/0331824 A1* | 11/2018 | Racz | G08B 13/196 |
| 2019/0081930 A1* | 3/2019 | Hunt, IV | H04L 63/083 |
| 2019/0327328 A1* | 10/2019 | Smith | H04L 43/0876 |
| 2020/0127977 A1* | 4/2020 | Hunt, IV | H04L 63/083 |
| 2020/0304477 A1* | 9/2020 | Venkataraman | H04L 12/4633 |

OTHER PUBLICATIONS

David Naylor et al., Multi-Context TLS (mcTLS): Enabling Secure In-Network Functionality in TLS, ACM SIGCOMM Computer Communication Review vol. 45 Issue 4, Aug. 2015, pp. 1-14.

Craig Hill et al., Innvoation in Ethernet Enc2016, pp. 1-22ryption (802.1AE—MACsec) for Securing High Speed (1-100GE) WAN Deployments, CISCO, 2016, pp. 1-22.

* cited by examiner

203

| Layer | Structure |
|---|---|
| Application | Application Header (AH)  [AH \| Data] |
| Presentation | Presentation Header (PH)  [PH \| Data] |
| Session | Session Header (SH)  [SH \| Data] |
| Transport | Transport Header (TH)  [TH \| Data] |
| Network | Network Header (NH)  [NH \| Data] |
| Data Link | Data Link Header (DH)  [DH \| Data \| CS] |
| Physical | [Data] |

FIG. 2C

SELECTIVELY DISCLOSING CONTENT OF DATA CENTER INTERCONNECT ENCRYPTED LINKS

FIELD

The subject matter disclosed herein relates to secure data transfer and more particularly relates to selectively disclosing content of encrypted links.

BACKGROUND

Critical Wide Area Network ("WAN") connections, like a data center interconnect, need security solutions in order to mitigate various attack vectors. The critical WAN connections typically use layer 2 encryption protocols, like the Institute of Electrical and Electronics Engineers ("IEEE") media access control ("MAC") security standard, called MACSec, in order to provide confidentiality and integrity of the entire network packet. While adding security, layer 2 encryption represents a drawback from the functionality perspective because intermediary WAN devices are not able to inspect the packet fields in order to respect a custom Service Level Agreement ("SLA").

BRIEF SUMMARY

An apparatus for selectively disclosing content of encrypted links includes a packet encryption circuit configured to use a plurality of encryption keys to encrypt each of two or more portions of a data packet. Each portion is encrypted with a different encryption key of the plurality of encryption keys and each portion includes one or more layers of the data packet and a last portion includes at least a payload of the data packet. A first portion of the two or more portions includes a layer of the data packet with media access control ("MAC") information. The apparatus includes a packet transmitter configured to transmit, from a source router, an encrypted data packet to an intermediate router between the source router and a destination router. The encrypted data packet includes an encrypted version of the data packet encrypted using the plurality of encryption keys. The intermediate router has one or more of the plurality of encryption keys sufficient for a service level agreement of the intermediate router and lacks a portion of the plurality of encryption keys, and the source and destination routers use a MAC security standard for encryption and decryption of the data packet using the plurality of encryption keys.

An apparatus for partially decrypting an encrypted data packet includes a packet receiver, in an intermediate router, configured to receive an encrypted data packet being transmitted from a source router to a destination router. The source and destination routers use a MAC security standard for encryption and decryption of the data packet. The apparatus includes a partial decryption circuit configured to use one or more encryption keys received from the source router to decrypt one or more layers of the encrypted data packet while leaving one or more additional lower layers and a payload of the encrypted data packet encrypted. The decrypted layers include information to process the encrypted data packet according to a service level agreement of the intermediate router. The apparatus includes a routing circuit configured to determine a priority of the encrypted data packet based on the service level agreement and the information of the decrypted layers. The apparatus includes a packet re-transmitter configured to transmit a version of the encrypted data packet in accordance with the determined priority of the encrypted data packet and the service level agreement of the intermediate router. The version of the encrypted data packet matches the encrypted data packet received by the packet receiver.

A method for selectively disclosing content of encrypted links includes using a plurality of encryption keys to encrypt each of two or more portions of a data packet. Each portion is encrypted with a different encryption key of the plurality of encryption keys and each portion includes one or more layers of the data packet and a last portion includes at least a payload of the data packet. A first portion of the two or more portions includes a layer of the data packet includes MAC information. The method includes transmitting, from a source router, an encrypted data packet to an intermediate router between the source router and a destination router. The encrypted data packet includes an encrypted version of the data packet encrypted using the plurality of encryption keys. The intermediate router has one or more of the plurality of encryption keys sufficient for a service level agreement of the intermediate router and lacks a portion of the plurality of encryption keys, and the source and destination routers use a MAC security standard for encryption and decryption of the data packet using the plurality of encryption keys.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2C is a schematic block diagram illustrating layer structure of a data packet;

DETAILED DESCRIPTION

Figure 1:
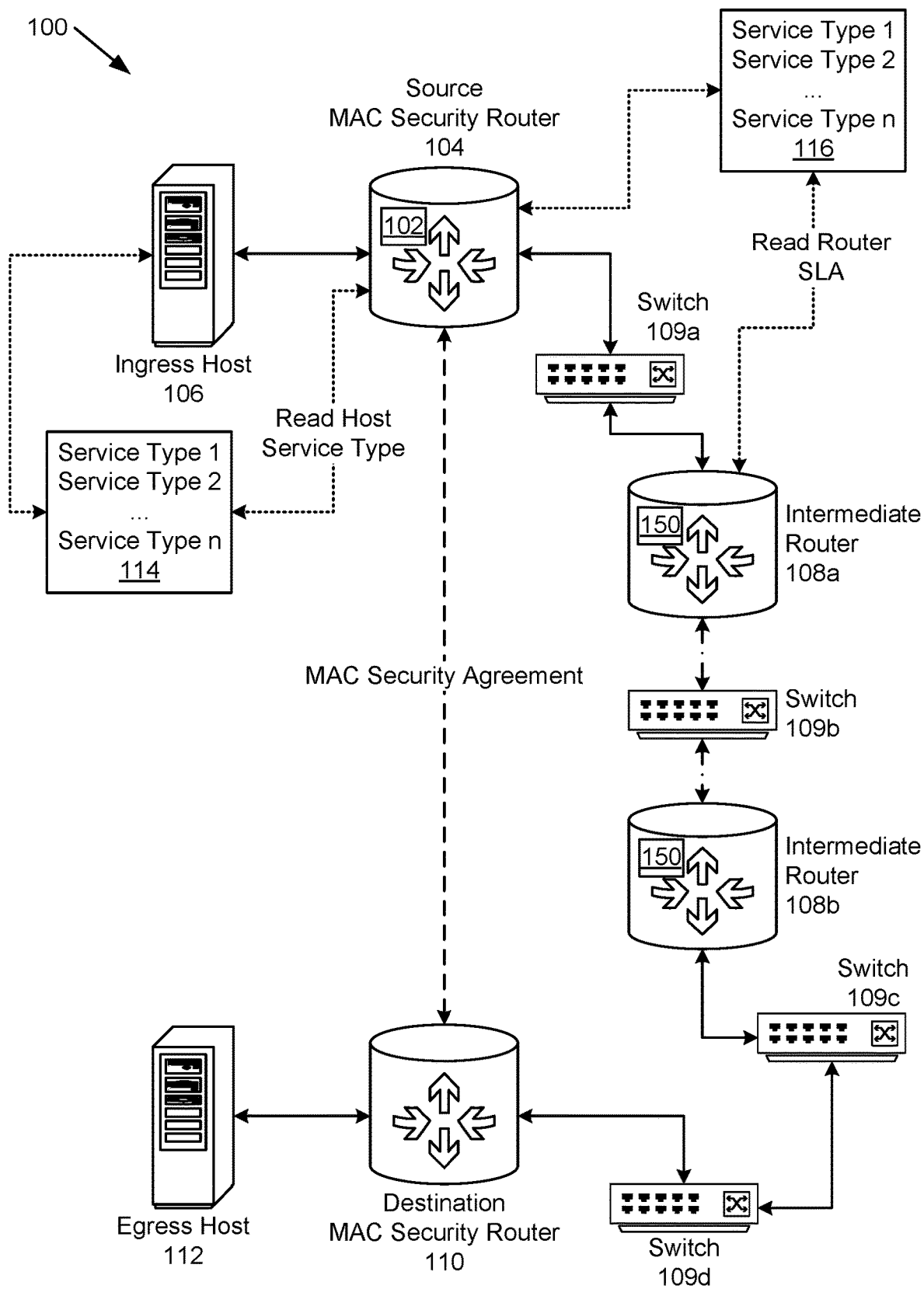
FIG. 1 is a schematic block diagram illustrating one embodiment of a network with media access control ("MAC") security routers and intermediate routers.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python®, Ruby, Java™, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

An apparatus for selectively disclosing content of encrypted links includes a packet encryption circuit configured to use a plurality of encryption keys to encrypt each of two or more portions of a data packet. Each portion is encrypted with a different encryption key of the plurality of encryption keys and each portion includes one or more layers of the data packet and a last portion includes at least a payload of the data packet. A first portion of the two or more portions includes a layer of the data packet with media access control ("MAC") information. The apparatus includes a packet transmitter configured to transmit, from a source router, an encrypted data packet to an intermediate router between the source router and a destination router. The encrypted data packet includes an encrypted version of the data packet encrypted using the plurality of encryption keys. The intermediate router has one or more of the plurality of encryption keys sufficient for a service level agreement of the intermediate router and lacks a portion of the plurality of encryption keys, and the source and destination routers use a MAC security standard for encryption and decryption of the data packet using the plurality of encryption keys.

In some embodiments, each of the two or more portions correspond to a single layer of the data packet and the last portion includes at least the payload and one or more layers of the data packet. In other embodiments, the apparatus includes a service discovery circuit that identifies an intermediate router between the source and destination routers and identifies the service level agreement of the intermediate router, and an encryption key transmitter that transmits one or more encryptions keys to the intermediate router corresponding to one or more layers of the data packet sufficient for the service level agreement of the intermediate router and the encryption key transmitter does not transmit encryption keys to the intermediate router for layers of the data packet beyond layers sufficient for the service level agreement of the intermediate router.

In other embodiments, the service discovery circuit identifies two or more intermediate routers between the source and destination routers and a requested service level agreement of each of the two or more intermediate routers and, for each of the two or more intermediate routers, the encryption key transmitter transmits one or more encryptions keys to the intermediate router corresponding to one or more layers of the data packet sufficient for the service level agreement of the intermediate router and the encryption key transmitter does not transmit encryption keys to the intermediate router for layers of the encrypted data packet beyond layers sufficient for the service level agreement of the intermediate router. In other embodiments, at least two of the two or more intermediate routers have different service level agreements. In other embodiments, the service discovery circuit queries an ingress host transmitting the data packet to determine one or more types of content available to be transmitted by the ingress host and the encryption key transmitter uses the one or more types of content available to be transmitted by the ingress host and the service level agreement of the intermediate router to determine which encryption keys to transmit to the intermediate router. In other embodiments, the encryption key transmitter circuit transmits the plurality of encryption keys to the destination router.

In some embodiments, the MAC security standard is the Institute of Electrical and Electronics Engineers ("IEEE") 802.1AE standard. In other embodiments, the data packet includes a layer 2, a layer 3, a transport layer and one or more application context layers and the packet encryption circuit encrypts layer 2 with a first encryption key, the packet encryption circuit encrypts the layer 3 with a second encryption key, the packet encryption circuit encrypts the transport layer with a third encryption key, and the packet encryption circuit encrypts the one or more application context layers each with a separate encryption key.

An apparatus for partially decrypting an encrypted data packet includes a packet receiver, in an intermediate router, configured to receive an encrypted data packet being transmitted from a source router to a destination router. The source and destination routers use a MAC security standard for encryption and decryption of the data packet. The apparatus includes a partial decryption circuit configured to use one or more encryption keys received from the source router to decrypt one or more layers of the encrypted data packet while leaving one or more additional lower layers and a payload of the encrypted data packet encrypted. The decrypted layers include information to process the encrypted data packet according to a service level agreement of the intermediate router. The apparatus includes a routing circuit configured to determine a priority of the encrypted data packet based on the service level agreement and the information of the decrypted layers. The apparatus includes a packet re-transmitter configured to transmit a version of the encrypted data packet in accordance with the determined priority of the encrypted data packet and the service level agreement of the intermediate router. The version of the encrypted data packet matches the encrypted data packet received by the packet receiver.

In some embodiments, the apparatus includes a service level broadcaster configured to broadcast, from the intermediate router, the service level agreement of the intermediate router to the source router from which the intermediate router received the one or more encryption keys. In other embodiments, the apparatus includes an encryption key receiver, at the intermediate router, configured to receive from the source router one or more encryption keys configured to decrypt one or more layers of an encrypted data packet transmitted from the source router. The one or more layers of the encrypted data packet provides information for the intermediate router to read information from the encrypted data packet in compliance with the service level agreement of the intermediate router. In other embodiments, the MAC security standard is the IEEE 802.1AE standard. In other embodiments, the intermediate router does not use the MAC security standard and is not authorized to decrypt layers of the encrypted data packet beyond the one or more layers corresponding to the one or more encryption keys received from the source router.

A method for selectively disclosing content of encrypted links includes using a plurality of encryption keys to encrypt each of two or more portions of a data packet. Each portion is encrypted with a different encryption key of the plurality of encryption keys and each portion includes one or more layers of the data packet and a last portion includes at least a payload of the data packet. A first portion of the two or more portions includes a layer of the data packet includes MAC information. The method includes transmitting, from a source router, an encrypted data packet to an intermediate router between the source router and a destination router. The encrypted data packet includes an encrypted version of the data packet encrypted using the plurality of encryption keys. The intermediate router has one or more of the plurality of encryption keys sufficient for a service level agreement of the intermediate router and lacks a portion of the plurality of encryption keys, and the source and destination routers use a MAC security standard for encryption and decryption of the data packet using the plurality of encryption keys.

In some embodiments, each of the two or more portions correspond to a single layer of the data packet and the last portion includes at least the payload and one or more layers of the data packet. In other embodiments, the method includes identifying an intermediate router between the source and destination routers and identifying the service level agreement of the intermediate router, and transmitting one or more encryptions keys to the intermediate router corresponding to one or more layers of the data packet sufficient for the service level agreement of the intermediate router and not transmitting encryption keys to the intermediate router for layers of the data packet beyond layers sufficient for the service level agreement of the intermediate router.

In some embodiments, identifying an intermediate router between the source and destination routers and identifying a requested service level agreement of the intermediate router includes identifying two or more intermediate routers between the source and destination routers and identifying a requested service level agreement of each of the two or more intermediate routers and the method includes, for each of the two or more intermediate routers, transmitting one or more encryptions keys to the intermediate router corresponding to one or more layers of the data packet sufficient for the service level agreement of the intermediate router and not transmitting encryption keys to the intermediate router for layers of the data packet beyond layers sufficient for the service level agreement of the intermediate router. In other embodiments, the method includes querying an ingress host transmitting the data packet to determine one or more types of content available to be transmitted by the ingress host and using the one or more types of content available to be transmitted by the ingress host and the service level agreement of the intermediate router to determine which encryption keys to transmit to the intermediate router. In other embodiments, the method includes transmitting the plurality of encryption keys to the destination router.

FIG. 1 is a schematic block diagram illustrating one embodiment of a network 100 with MAC security routers 104, 110 and intermediate routers 108. The network includes an encryption apparatus 102 in a source MAC security router 104, an ingress host 106, intermediate routers 108a, 108b (collectively or generically "108"), switches 109a, 109b, 109c, 109d (collectively or generically "109"), a destination MAC security router 110, an egress host 112, host service information 114, intermediate router service information 116 and a packet decryption apparatus 150 in an intermediate router 108a, which are described in more detail below.

The encryption apparatus 102 is depicted in the source MAC security router 104, and the source MAC security router 104 transmits data packets received from the ingress host 106 to the destination MAC security router 110, which then transmits the data packets to the egress host 112. In other embodiments, the destination MAC security router 110 becomes a source MAC security router for data packets received from the egress host 112, which becomes an ingress host, so the destination MAC security router 110, as a source MAC security router, includes the encryption apparatus 102.

The encryption apparatus 102 encrypts the data packets received from the ingress host 106 and exchanges encryption keys, based on a MAC security agreement, with the destination MAC security router 110 for decryption before transmitting the data packets to the egress host 112. The encryption apparatus 102 encrypts portions of the received data packets with different encryption keys and transmits some of the encryption keys to intermediate routers 108 based on a service level agreement ("SLA") of each intermediate router 108 to allow the intermediate routers to decrypt portions of the encrypted data packets as needed for the SLAs of the intermediate routers 108. For example, if the SLA dictates that the intermediate router needs access to layer 4, the encryption apparatus 103 sends one or more keys to the intermediate router 108 to decrypt layer 4 and also to decrypt encrypted layers above layer 4, e.g. layer 3 and layer 2. The encryption apparatus 102 is discussed in more detail below with regard to the apparatuses 300, 400 of FIGS. 3 and 4.

The source and destination MAC security routers 104, 110, in conjunction with the encryption apparatus 102, uses a MAC security standard. In some embodiments, the MAC security standard is the IEEE 802.1AE standard and the source and destination MAC security routers 104, 110 are IEEE MAC Security standard ("MACSec") routers which encrypt data packets at the MAC layer, which is layer 2 of the Open System Interconnection ("OSI") model or data link layer. Typically, a MACSec router encrypts a data packet at the layer 2 ("L2") down to the payload and leaves just enough information unencrypted for the MACSec router to transmit the data packet to a destination MACSec router, such as the source MAC and the destination MAC. In other embodiments, the MAC security routers use a MAC security standard different than the IEEE 802.1AE, such as a future standard that deals with layer 2 encryption and security.

In some embodiments, the MAC security routers 104, 110 protect internet protocol ("IP") traffic. In other embodiments, the MAC security routers 104, 110 protect address resolution protocol ("ARP") traffic. In other embodiments, the MAC security routers 104, 110 protect dynamic host configuration protocol ("DHCP") traffic. In other embodiments, the MAC security routers 104, 110 operates at layer 2 and is useful for protection using higher layer protocols.

In some embodiments, the MAC security standard uses cryptography to exchange encryption keys between MAC security routers 104, 110 and the encryption apparatus 102 exchanges a limited set of encryption keys with intermediate routers 108 on an as-needed basis. in some embodiments, the MAC security routers 104, 110 use the Galois/Counter Mode ("GCM") operation for symmetric-key cryptography and also use the Advanced Encryption Standard ("AES"). In other embodiments, the MAC security routers 104, 110 use other encryption techniques and standards to encrypt data packets from layer 2 to the payload of the data packets.

The ingress host 106, in some embodiments, is a computing device that transmits data packets to the source MAC security router 104 for transport to the egress host 112. The data packet, in some embodiment, originates at the ingress host 106. For example, the ingress host 106 may receive a command to transmit a file, an email, a text message, a video, etc. and may create packets from the file, email, etc. In other embodiments, the ingress host 106 receives packets to transmit to the source MAC security router 104 from another computing device over a network.

The ingress host 106, in some embodiments, encapsulates a payload of the data packet in various layers. Layering is discussed further with regard to FIGS. 2A and 2B. In other embodiments, the ingress host 106 receives a data packet that has already been encapsulated from another computing device connected through a local area network ("LAN") to the ingress host 106. In other embodiments, ingress host 106 is a computing device in a data center and the source MAC security router 104 is a gateway to computing devices outside the data center. In some embodiments, the ingress host 106 is a client connected to a server over the network 100. In other embodiments, the ingress host 106 is a server connected to one or more clients over the network 100. The ingress host 106 may be a rack-mounted computer, a desktop computer, a laptop computer, a tablet computer, a workstation, a smartphone or other computing device.

The destination MAC security router 110 receives encrypted data packets transmitted initially from the source MAC security router 104 and transmits unencrypted data packets to the egress host 112. The egress host 112 receives the encrypted data packet from the destination MAC security router 110. The egress host 112, in some embodiments, assembles a file, a video stream, etc. using received data packets. In other embodiments, the egress host 112 transmits data packets on to another computing device connected over a LAN. In some embodiments, the egress host 112 is a part of a data center. The egress host 112, in various embodiments, may be a rack-mounted computer, a desktop computer, a laptop computer, a tablet computer, a workstation, a smartphone or other computing device. The egress host 112 may be a client or a server.

In some embodiments, the egress host 112 becomes an ingress host, the ingress host 106 becomes an egress host, the destination MAC security router 110 becomes a source MAC security router and has an encryption apparatus 102, and the source MAC security router 104 becomes a destination MAC security router. The terms "ingress," "source," "destination" and "egress" are used in the network 100 of FIG. 1 for convenience in explaining various embodiments of the claims and one of skill in the art will recognize that the network 100 may have other configurations with different routers paired in a MAC security standard arrangement.

The source MAC security router 104 is connected to the destination MAC security router 110 through one or more intermediate routers 108. The source MAC security router 104 may also be connected to the destination MAC security router 110 through one or more switches 109. Typically, an encrypted data packet transmitted from the source MAC security router 104 is encapsulated at the layer 2 level but includes some unencrypted information to enable switches 109 to forward the encrypted data packet to the destination MAC security router 110. For example, the encrypted data packet may include an unencrypted source MAC address and an unencrypted destination MAC address, which enables the switches 109 to forward the encrypted data packet to the destination MAC security router 110.

In some embodiments, the network 100 includes other routers that receive and forward the encrypted data packet using the unencrypted information of the encrypted data packet similar to the switches 109. The switches 109 and routers that merely forward the encrypted data packet typically receive the encrypted data packet, read the source and destination MAC addresses as well as possibly other unencrypted information of the encrypted data packet and then forward the encrypted data packet without unencrypting any portion of the encrypted data packet. In various embodiments, different intermediate routers 108 have different SLAs.

The intermediate routers 108 are responsive to a service level agreement ("SLA") that necessitates inspection of encrypted information in the encrypted data packet. For example, an SLA of an intermediate router (e.g. 108a) may require that a data packet that is part of a video stream be sent with a higher priority than a data packet of another type, such as a data packet that is part of an email. Information indicating that the encrypted data packet is a video or email may be in the transport layer (layer 4) or other layer so that to properly prioritize transmission of the encrypted data packet, the intermediate router 108a must access and inspect the transport layer. Unencrypting the entire encrypted data packet would be a security risk because an attacker could intercept contents of the unencrypted data packet at the intermediate router 108a. The encryption apparatus 102 encrypts data packets from the ingress host 106 with multiple encryption keys for different portions of the data packets and the intermediate routers 108 each include a packet decryption apparatus 150 that decrypts only portions of the encrypted data packets necessary for fulfilling SLA requirements, as explained below with respect to the apparatuses 500, 600 of FIGS. 5 and 6.

The intermediate routers 108, in some embodiments, may be a router of an internet service provider, a gateway for a company, a gateway for a university, or other router that include a service level agreement where some data packets are treated differently than other data packets. A service level agreement, for example, may require a certain quality of service ("QoS") for certain data packets. A QoS, in some embodiments, includes multiple levels of service where each level of service dictates a priority level of received data packets. For example, a highest QoS level may require that a received data packet be re-transmitted as soon as possible. Data packets of a next lower QoS level may be transmitted after any data packets with the highest QoS level but before data packets of other lower QoS levels. QoS may include other indicators of a level of service required for a data packet, such as Type of Service ("ToS"), Class of Service ("CoS"), IP precedence, Differentiated Services Code Point ("DSCP"), and the like. QoS service information may be included in various layers of a data packet.

In some embodiments, data packets of different levels of service are transmitted on different egress ports. In other embodiments, data packets of different levels of service are queued in different queues of an egress port. In addition to determining QoS for a data packet, an intermediate router 108 may implement an SLA by inspecting other information of a data packet header, such as type of data. For example, a header of a data packet at a particular layer may include information about the data in a payload of the data packet. The data type information, for example, may identify the payload as a video data, data from an email, data from a document, etc.

The network 100 may include wired connections, fiber optic connections, wireless connections, and the like. In some embodiments, the network is a single LAN. In other embodiments, the network includes one or more virtual LANs ("VLANs"). In other embodiments, the network 100 includes one or more virtual extensible LANs ("VXLANs"), which may use a tunneling protocol. In various embodiments, the network 100 includes multiple network types and/or multiple networks. For example, the network 100 may include a LAN for the ingress host 106 and other computing devices on the same side of the source MAC security router 104 as the ingress host 106. The network 100 may include a LAN for the egress host 112 and other computing devices on the same side of the source MAC security router 110 as the egress host 112. The network 100 may include one or more networks between the source and destination MAC security routers 104, 110. For example, a VLAN or VXLAN may be created between a client and host residing in LANs of the ingress host 106 and egress host 112 where the VLAN extends across various networks.

The wireless connection may be a mobile telephone network. The wireless connection may also employ a Wi-Fi® wireless network based on any one of the IEEE 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM"®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada. The wireless connection may be an infrared connection including connections conforming at least to the Infrared Physical Layer Specification ("IrPHY") as defined by the Infrared Data Association® ("IrDA" ®). Alternatively, the wireless connection may be a cellular telephone network communication. All standards and/or connection types include the latest version and revision of the standard and/or connection type as of the filing date of this application.

Figure 2A:
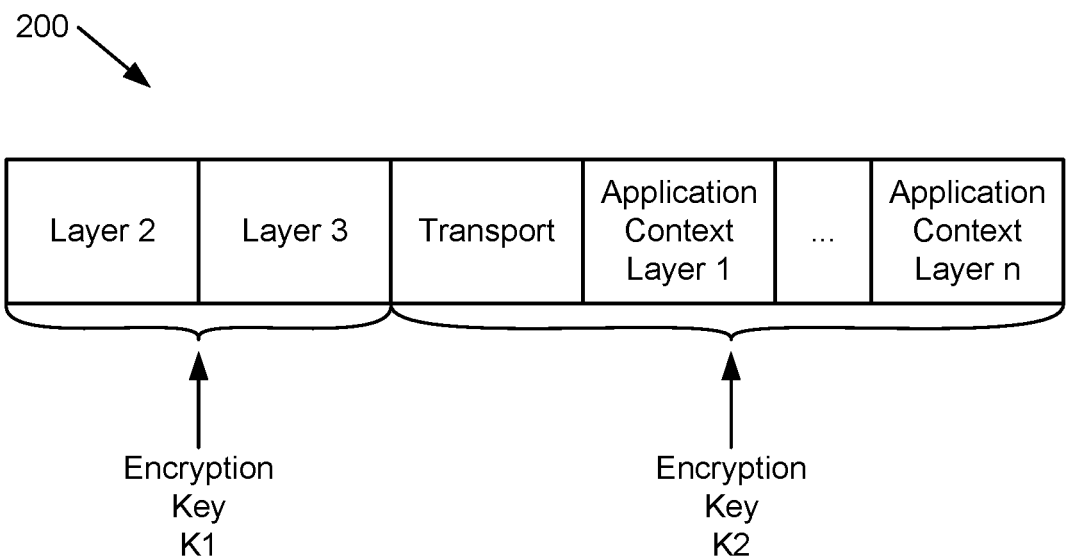
FIG. 2A is a schematic block diagram illustrating one embodiment of a data packet with some layers encrypted with an encryption key and other layers encrypted with another encryption key.

FIG. 2A is a schematic block diagram illustrating one embodiment 200 of a data packet with some layers encrypted with an encryption key k1 and other layers encrypted with another encryption key k2. In the embodiment, layer 2 and layer 3 are encrypted with encryption key k1 while the transport layer (layer 4) and application context layers 1-n are encrypted with a second encryption key k2. In the embodiment, the intermediate routers 108 have a SLA that needs access to layer 3 so the encryption apparatus 102 encrypts layer 2 and layer 3 with a first encryption key k1 and encrypts the transport layer and application context layers 1-n with a second encryption key k2. The application context layers may include a single payload or may include other layers. For example, the data packet may be from a VLAN or VXLAN which may create a data packet with multiple layers and may also encrypt the data packet created by the VLAN or VXLAN. Where the data packet of the VLAN or VXLAN are not encrypted, layers of this data packet, in some embodiments, are application context layers as depicted in FIG. 2A. This data packet may then be a payload for computing devices outside the VLAN, which may then add the transport layer, layer 3 and layer 2 and may then transport the data packet to the source MAC security router 104 and the encryption apparatus 102 encrypts the data packet as described. In the embodiment 200 depicted in FIG. 2A, the encryption apparatus 102 sends only key k1 to the intermediate routers 108.

An advantage to the embodiment 200 of FIG. 2A is that the encryption apparatus 102 is only required to break the data packet into as many portions as required by the various intermediate routers 108 require. If the intermediate routers 108 have the same SLA or have SLAs that require access to the same layer, the encryption apparatus 102 only needs to send a single encryption key k1 to the intermediate routers 108. If the intermediate routers 108 have different access requirements, the encryption apparatus 102 can break up the data packet into as many portions as necessary to allow access based on the various SLAs. The embodiment 200 of FIG. 2A may require retransmission of the encryption keys if an intermediate router 108 is added or changes its SLA. The encryption apparatus 102 would manage encryption keys for data packets being transmitted to the destination MAC security router 110.

Figure 2B:
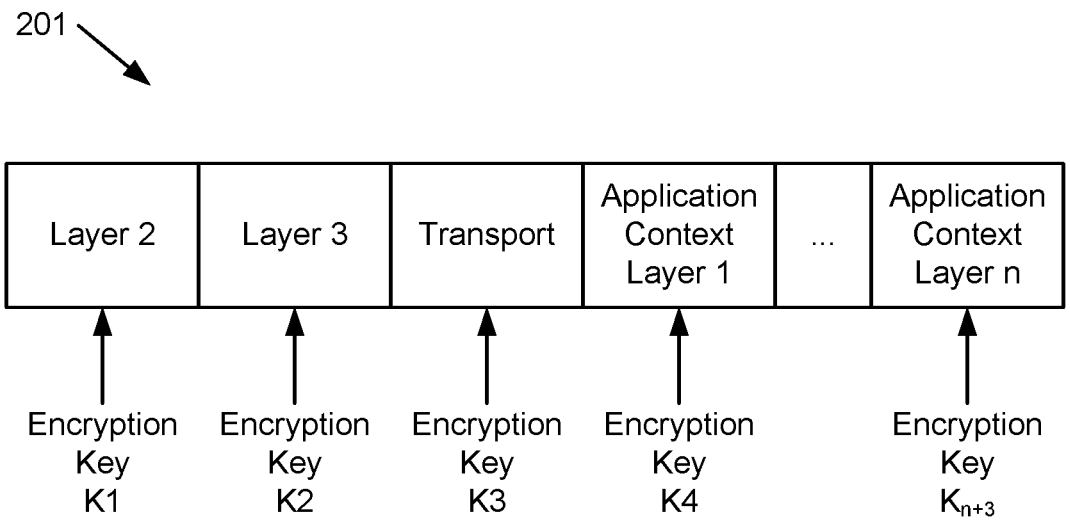
FIG. 2B is a schematic block diagram illustrating one embodiment of a data packet with each layer encrypted with a separate encryption key.

FIG. 2B is a schematic block diagram illustrating one embodiment 201 of a data packet with each layer encrypted with a separate encryption key. In the embodiment 201, layer 2 is encrypted with a first encryption key k1, layer 3 is encrypted with a second encryption key k2, the transport layer is encrypted with a third encryption key k3, the first application context layer 1 is encrypted with a fourth encryption key k4, and so forth until the $n^{th}$ application context layer, which includes the payload, is encrypted with an n+3 encryption key $k_{n+3}$. In the embodiment 201 of FIG. 2B, if a SLA of an intermediate router 108 requires access to layer 3, then the encryption apparatus 102 sends encryption keys k1 and k2 to decrypt layers 2 and 3. Advantageously, the embodiment 201 of FIG. 2B adds flexibility because the encryption apparatus 102 does not change what is encrypted but has a standard encryption scheme for all data packets, all SLAs, etc. The encryption apparatus 102 manages what encryption keys are sent to the various intermediate routers 108. For encryption, in the embodiment 201 of FIG. 2B there would be more processing overhead than the embodiment 200 of FIG. 2A, but the encryption apparatus 102 for the embodiment 200 of FIG. 2A would need a capability of encrypting multiple layers and would have to change when an SLA changes, a new intermediate router 108 is added, etc. Key management would be different for each embodiment 200, 201.

FIG. 2C is a schematic block diagram 203 illustrating layer structure of a data packet. In the embodiment, the data context layers include three layer: an application layer, a presentation layer, and a session layer. The transport layer is the same as in FIGS. 2A and 2B. The network layer is layer 3 and the data link layer is layer 2. When an application generates data to be sent, such as an email, the application encapsulates the email data and adds an application layer header. The application header information may include information to reconstruct the email, such as window size, fonts, etc. In this example, the session layer is layer 7. In some embodiments, the application breaks the data into two or more parts, which are each used to create a data packet.

The presentation layer is layer 6 and encapsulates the application header and data and adds a presentation header. The presentation layer, in some embodiments, is responsible for formatting of information to the application layer for further processing or display. The presentation layer, for example, may convert Extended Binary Coded Decimal Interchange Code ("EBCDIC")-coded text to an American Standard Code for Information Interchange ("ASCII")-coded file and the presentation header may include information identifying the file type, such as ASCII.

The session layer is layer 5 follows the same process and encapsulates the presentation header and data and adds a session header. The session header information may include information about managing a data flow, opening, closing and managing a session between end-user application processes, etc. The transport layer is layer 4 and again encapsulates the session header and data and adds a transport header. The transport layer may provide host-to-host communication services for applications, connection-oriented communication, reliability, flow control, multiplexing, etc. The network layer is layer 3 and includes information such as source and destination internet protocol ("IP") addresses or other information. In some embodiments, the network layer determines a best delivery path for data packets. The network layer encapsulates the transport header and data and adds a network header. The data link layer is layer 2 and encapsulates the network header and data and adds a data link header. The diagram 203 of FIG. 2C is one particular layering scheme and the embodiments described herein anticipate other layering schemes.

Figure 3:
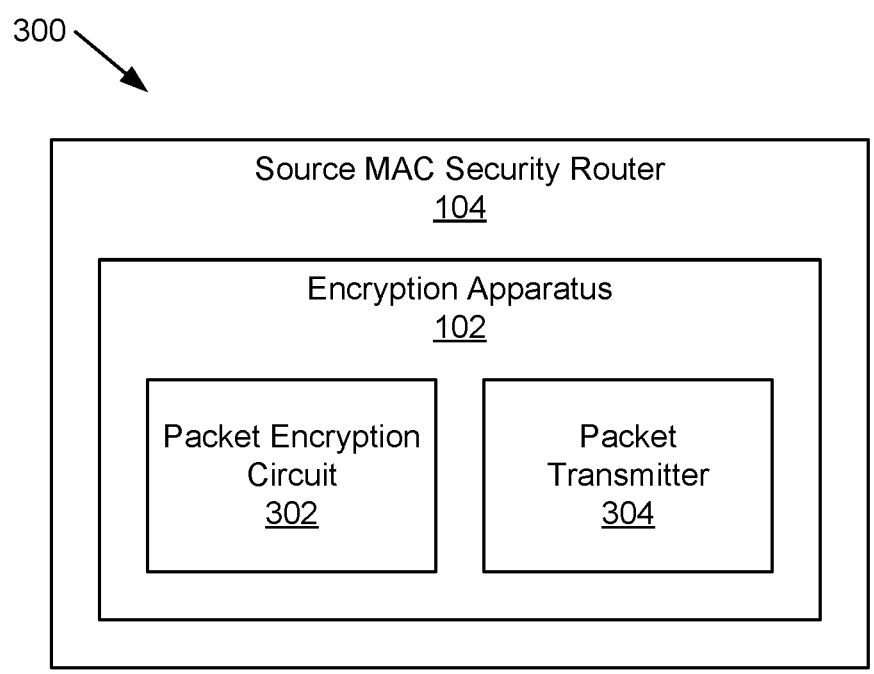
FIG. 3 is a schematic block diagram illustrating one embodiment of an apparatus for encrypting portions of a data packet each with a different encryption key and for transmitting an encrypted data packet to an intermediate router.

FIG. 3 is a schematic block diagram illustrating one embodiment of an apparatus 300 for encrypting portions of a data packet each with a different encryption key and for transmitting an encrypted data packet to an intermediate router 108. The apparatus 300 includes one embodiment of an encryption apparatus 102, in a MAC security router 104, with a packet encryption circuit 302 and a packet transmitter 304, which are described below.

The apparatus 300 includes a packet encryption circuit 302 configured to use a plurality of encryption keys to encrypt each of two or more portions of a data packet. Each portion of the data packet is encrypted with a different encryption key of the plurality of encryption keys. Each portion of the data packet includes one or more layers of the data packet and a last portion of the data packet includes at least a payload of the data packet. A first portion of the data packet of the two or more portions includes a layer of the data packet with media access control ("MAC") information.

In one embodiment, the packet encryption circuit 302 encrypts multiple layers together with a single encryption key, as depicted in the embodiment 200 of FIG. 2A. In other embodiments, the packet encryption circuit 302 encrypts each layer, as depicted in the embodiment 201 of FIG. 2B. In both embodiments, a last portion of the data packet includes a payload. The payload is data that is intended to be transmitted to another location while layers that encapsulate the payload are intended to include information to route the data packet to an intended egress host 112 and other information that facilitates transmission, priority of the data packet, quality of service, etc. For example, information of a layer may include information to identify where the packet ends so a router 104, 108, 110 or switch 109 knows where a data packet ends and another begins. The information of a layer may include a data type, such as a video, a file, an email, a text, etc. Information in each layer is typically based on various standards.

In one embodiment, the packet encryption circuit 302 encrypts a first portion of the data packet based on an SLA of each of one or more intermediate routers 108. For example, if an SLA requires access to information of layer 3, the packet encryption circuit 302 encrypts layer 2 and layer 3 with a first encryption key k1 and encrypts the remainder of the data packet with another encryption key k2. The first encryption key k1 is sent to the intermediate router(s) 108 and both encryption keys k1, k2 are transmitted to the destination MAC security router 110.

In another embodiment, except for the last portion of the data packet, each of the two or more portions of the data packet correspond to a single layer of the data packet and the last portion of the data packet includes at least the payload and one or more layers of the data packet. For example, the packet encryption circuit 302 may encrypt layer 2 with a first encryption key k1, may encrypt layer 3 with a second encryption key k2, may encrypt the transport layer 2 with a third encryption key k3 and may encrypt the application context layers with a fourth encryption key k4 or may encrypt each layer of the application context layers each with a separate encryption key. Where the intermediate router 108 requires access to layer 3, encryptions keys k1 and k2 are sent to the intermediate router 108 to decrypt layer 2 and layer 3 to gain access to information in layer 3. In some embodiments, the MAC security standard is the IEEE 802.1AE standard.

The apparatus 300 includes a packet transmitter 304 configured to transmit, from a source router, such as the source MAC security router 104, an encrypted data packet to an intermediate router 108 between the source router and a destination router, such as the destination MAC security router 110. As used herein, "source router" is used synonymously with "source MAC security router" and "destination router" is used synonymously with "destination MAC security router." The encrypted data packet includes an encrypted version of the data packet encrypted by the packet encryption circuit 302 using the plurality of encryption keys. The intermediate router 108 has one or more of the plurality of encryption keys sufficient for a service level agreement of the intermediate router 108 and lacks a portion of the plurality of encryption keys. The source and destination routers (e.g. source MAC security router 104 and destination MAC security router 110) use a MAC security standard for encryption and decryption of the data packet using the plurality of encryption keys, for example, the IEEE 802.1AE standard or other relevant standard. In some embodiments, the packet transmitter 304 transmits the encrypted data packet to a switch (e.g. 109*a*), which then forwards the encrypted data packet to the intermediate router 108*a*.

Figure 4:
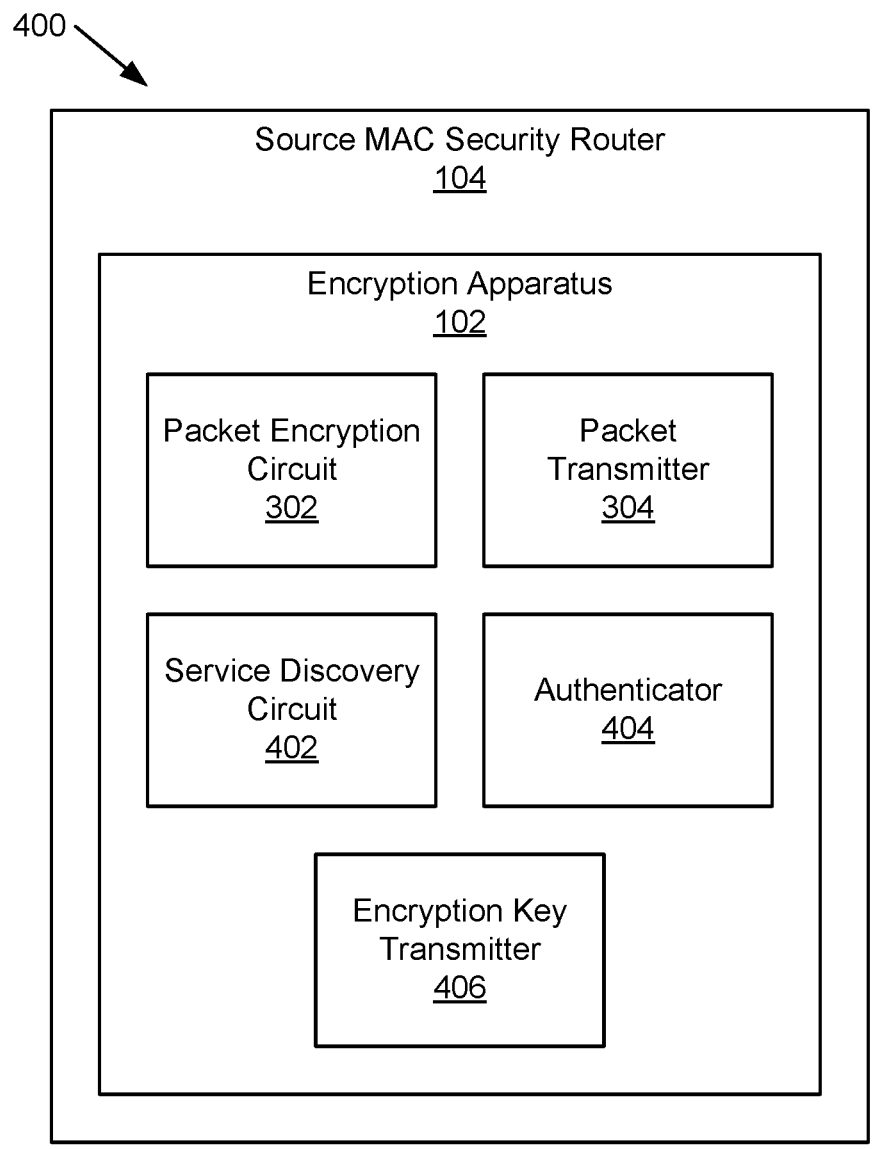
FIG. 4 is a schematic block diagram illustrating another embodiment of an apparatus for encrypting portions of a data packet each with a different encryption key and for transmitting an encrypted data packet to an intermediate router.

FIG. 4 is a schematic block diagram illustrating another embodiment of an apparatus 400 for encrypting portions of a data packet each with a different encryption key and for transmitting an encrypted data packet to an intermediate router 108. The apparatus 400 includes another embodiment of an encryption apparatus 102, in the source MAC security router 104, that includes a packet encryption circuit 302 and a packet transmitter 304, which are substantially similar to those described above in relation to the apparatus 300 of FIG. 3. The encryption apparatus 102, in various embodiments, includes a service discovery circuit 402, an authenticator 404 and/or an encryption key transmitter 406, which are discussed below.

The apparatus 400 includes a service discovery circuit 402 that identifies an intermediate router (e.g. 108*a*) between the source and destination routers (e.g. source MAC security router 104 and destination MAC security router 110) and identifies the service level agreement of the intermediate router 108*a*. In some embodiments, the service discovery circuit 402 actively searches a network 100 to identify an intermediate router 108*a* and associated SLA. In other embodiments, the service discovery circuit 402 receives a message broadcast by the intermediate router 108*a* to identify the intermediate router 108*a*. In other embodiments, once the intermediate router 108*a* is identified, the service discovery circuit 402 communicates with the intermediate router 108*a* to determine the SLA of the router. In other embodiments, the service discovery circuit 402 receives a broadcast from the intermediate router 108*a* that includes the SLA of the intermediate router 108*a*.

The apparatus 400, in some embodiments, includes an authenticator 404 that authenticates the intermediate router 108 before transmission of encryption keys. In some embodiments, the authenticator 404 acts after the service discovery circuit 402 identifies the intermediate router 108 in a pathway between the source and destination MAC security routers 104, 110. In other embodiments, the authenticator 404 acts after receiving a broadcast from the intermediate router 108 making the existence of the intermediate router 108 known to the source MAC security router 104. In some embodiments, the authenticator 404 uses public/private key encryption. In other embodiments, the authenticator 404 uses a digital certificate of the intermediate router 108 to authenticate the intermediate router 108. The authenticator 404 may use other typical authentication methods to authenticate the intermediate router 108 prior to sending encryption keys.

The apparatus 400, in some embodiments, includes an encryption key transmitter 406 that transmits one or more encryptions keys to the intermediate router 108 corresponding to one or more layers of the data packet sufficient for the service level agreement of the intermediate router 108. The encryption key transmitter 406 does not transmit encryption keys to the intermediate router 108 for layers of the data packet beyond layers sufficient for the SLA of the intermediate router 108. For the example depicted in FIG. 2A, if the SLA requires information from layer 3, the packet encryption circuit 302 encrypts layer 2 and layer 3 with a first encryption key k1 and the rest of the data packet with another encryption key k2 before the packet transmitter 304 transmits the encrypted packet. Prior to data packet encryption, the encryption key transmitter 406 sends the first encryption key k1 to the intermediate router 108 and would not send the second encryption key k2 to the intermediate router 108 but would instead send both encryptions keys k1 and k2 to the destination MAC security router 110.

In the embodiment 201 of FIG. 2B, where again the SLA of the intermediate router 108 requires information from layer 3, the packet encryption circuit 302 encrypts layer 2 with a first encryption key k1, layer 2 with a second encryption key k2, the transport layer with a third encryption key k3, the first application layer with a fourth encryption key k4, etc. to the last layer with a last encryption key $k_{n+3}$. The packet transmitter 304 then transmits this encrypted data packet to the intermediate router 108. Prior to processing the data packet by the packet encryption circuit 302, the encryption key transmitter 406 sends the first and second encryption keys k1 and k2 to the intermediate router 108. The encryption key transmitter 406 does not send encryption keys k3-$k_{n+3}$ to the intermediate router 108. In some embodiments, the encryption key transmitter 406 and/or the apparatus 400 creates encryption keys for each layer anticipated data packets.

In some embodiments, the service discovery circuit 402 identifies two or more intermediate routers (e.g. 108a, 108b) between the source and destination routers (e.g. 104, 110) and the SLA for each intermediate router 108a, 108b. In some embodiments, the intermediate routers 108a, 108b each have a different SLA. For each of the two or more intermediate routers 108, the encryption key transmitter 406 transmits one or more encryptions keys to the intermediate router 108 corresponding to one or more layers of the data packet sufficient for the SLA of the intermediate router 108 and the encryption key transmitter 406 does not transmit encryption keys to the intermediate router 108 for layers of the data packet beyond layers sufficient for the service level agreement of the intermediate router 108.

For example, one intermediate router 108a may have an SLA that requires information from layer 3 of the encrypted data packet while the second intermediate router 108b may have an SLA that requires information from the transport layer of the encrypted data packet. For the embodiment of FIG. 2B, the encryption key transmitter 406 transmits the first and second encryption keys k1, k2 to the first intermediate router 108a while not transmitting the rest of the encryption keys k3-$k_{n+3}$ to the first intermediate router 108a. The encryption key transmitter 406 transmits the first, second and third encryption keys k1, k2, k3 to the second intermediate router 108b while not transmitting the rest of the encryption keys k4-$k_{n+3}$ to the second intermediate router 108b.

In some embodiments, the service discovery circuit 402 queries the ingress host 106 transmitting the data packet to determine one or more types of content available to be transmitted by the ingress host and the encryption key transmitter 406 uses the one or more types of content available to be transmitted by the ingress host 106 and the service level agreement of the intermediate router 108 to determine which encryption keys to transmit to the intermediate router 108. For example, the service discovery circuit 402 may query the ingress host 106 and may then read and/or receive the service types 114 from the ingress host 106. For instance, the ingress host 106 may transmit files, emails and video. The service discovery circuit 402 may determine from the first intermediate router 108a that the SLA of the first intermediate router 108a requires prioritized transmission of video and information about whether or not a data packet encapsulates video data is in the transport layer. The service discovery circuit 402 then determines that the first intermediate router 108a requires access to the transport layer so the encryption key transmitter 406 sends encryption keys for the first intermediate router 108a to access the transport layer of a received encrypted data packet.

The encryption key transmitter 406, in some embodiments, transmits each encryption key (k1 and k2 for the embodiment 200 of FIG. 2A or k1-$k_{n+3}$ for the embodiment 201 of FIG. 2B) to the destination MAC security router 110. In some embodiments, the encryption key transmitter 406 additionally transmits an encryption key to the destination MAC security router 110 used by the destination MAC security router 110 to verify that the encrypted data packet has not been altered after leaving the source MAC security router 104. For example, the encrypted data packet may include checksum bits encrypted using a checksum encryption key and the encryption key transmitter 406 is configured to transmit the checksum encryption key to the destination MAC security router 110 in addition to other encryption keys for layers of the encrypted data packets.

Figure 5:
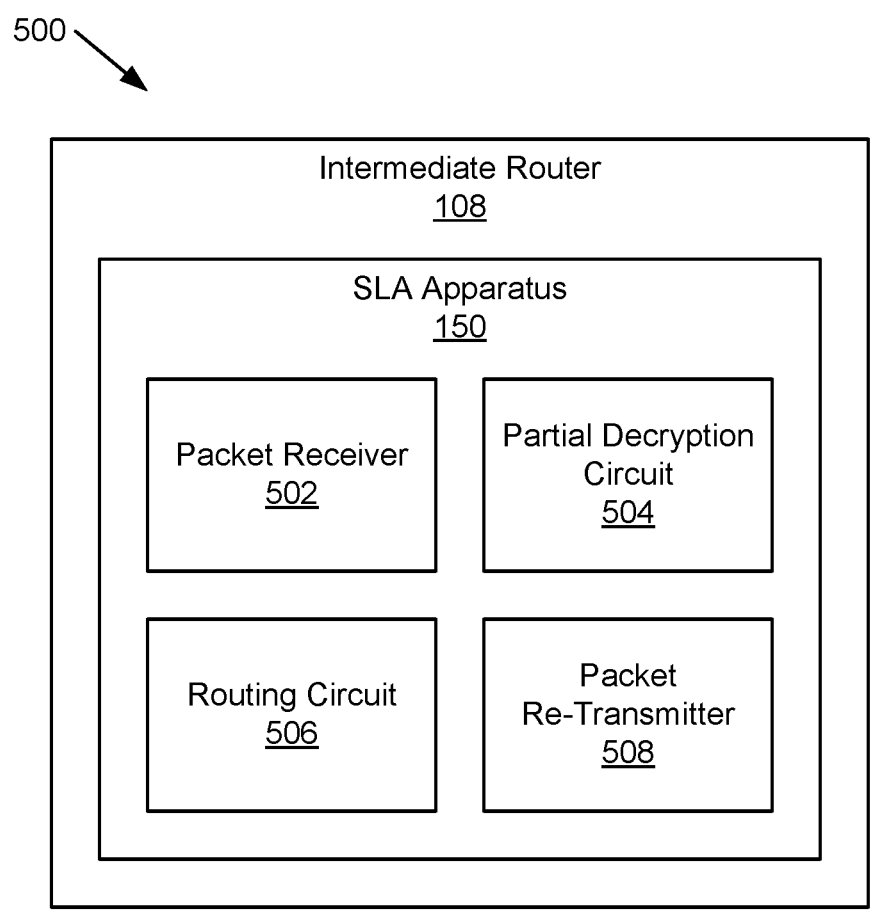
FIG. 5 is a schematic block diagram illustrating one embodiment of an apparatus for receiving an encrypted packet at an intermediate router, decrypting a portion of the encrypted data packet based on a service level agreement and transmitting the encrypted data packet based on priority determined from the decrypted portions of the data packet.

FIG. 5 is a schematic block diagram illustrating one embodiment of an apparatus 500 for receiving an encrypted packet at an intermediate router 108, decrypting a portion of the encrypted data packet based on a SLA and transmitting the encrypted data packet based on priority determined from the decrypted portions of the data packet. The apparatus 500 includes an embodiment of a packet decryption apparatus 150, in an intermediate router 108, with a packet receiver 502, a partial decryption circuit 504, a routing circuit 506 and a packet re-transmitter 508, which are described below.

The apparatus 500 includes a packet receiver 502, in an intermediate router 108, that receives a data packet being transmitted from a source router (e.g. 104) to a destination router (e.g. 110). The source and destination routers 104, 110 use a MAC security standard for encryption and decryption of the data packet. For example, the first intermediate router 108a may include the packet decryption apparatus 150 with the packet receiver 502 and the packet receiver 502 may receive an encrypted data packet transmitted from the source MAC security router 104 through the first switch 109a to the first intermediate router 108a. The MAC security standard is the IEEE 802.1AE standard or other applicable standard.

The apparatus 500 includes a partial decryption circuit 504 configured to use one or more encryption keys received from the source router 104 to decrypt one or more layers of the encrypted data packet while leaving one or more additional lower layers and a payload of the encrypted data packet encrypted. The decrypted layers include information to process the encrypted data packet according to a service level agreement of the intermediate router 108. For example, the SLA of the first intermediate router 108a may require access to layer 3 of a received encrypted data packet so the partial decryption circuit 504 decrypts layer 2 and layer 3 of the encrypted data packet using one or more encryption keys (e.g. k1 for FIG. 2A and k1 and k2 for FIG. 2B). The first intermediate router 108a does not have encryption keys beyond those to decrypt up to layer 3 (e.g. k2 for FIG. 2A and k3-$k_{n+3}$ for FIG. 2B).

The apparatus 500 includes a routing circuit 506 configured to determine a priority of the encrypted data packet based on the SLA and the information of the decrypted layers. For example, video data may require a first priority, text message data may require a second priority, and email data may require a third priority. The intermediate routers 108 may include two or more egress ports and associated queues where the egress ports correspond to different priority levels. In other embodiments, an egress port may include two or more queues where each port is assigned a priority. A highest priority queue of an egress port may have priority over other queues for the egress port so that data in the highest priority queue is transmitted before data in the other queues. The routing circuit 506, in some embodiments, determines priority of the encrypted data packet by assigning the encrypted data packet to a particular queue of a particular egress port of the intermediate router 108a.

The apparatus 500 includes a packet re-transmitter 508 configured to transmit a version of the encrypted data packet in accordance with the determined priority of the encrypted data packet and the service level agreement of the intermediate router 108a. The version of the encrypted data packet transmitted by the packet re-transmitter 508 matches the encrypted data packet received by the packet receiver 502. In one example, the partial decryption circuit 504 or other part of the packet decryption apparatus 150 is configured to create a copy of the encrypted data packet received by the packet receiver 502. The partial decryption circuit 504 may then use the copy of the encrypted data packet and the packet re-transmitter 508 may transmit the original encrypted data packet, or vice versa.

For encrypted data packets transmitted from the source router 104 to the destination router 110, the intermediate router 108 does not use the MAC security standard and is not authorized to decrypt layers of the encrypted data packet beyond the one or more layers corresponding to the one or more encryption keys received from the source router 104. In other scenarios, the intermediate router 108 may act as a source router and may have a MAC security agreement with another router.

Figure 6:
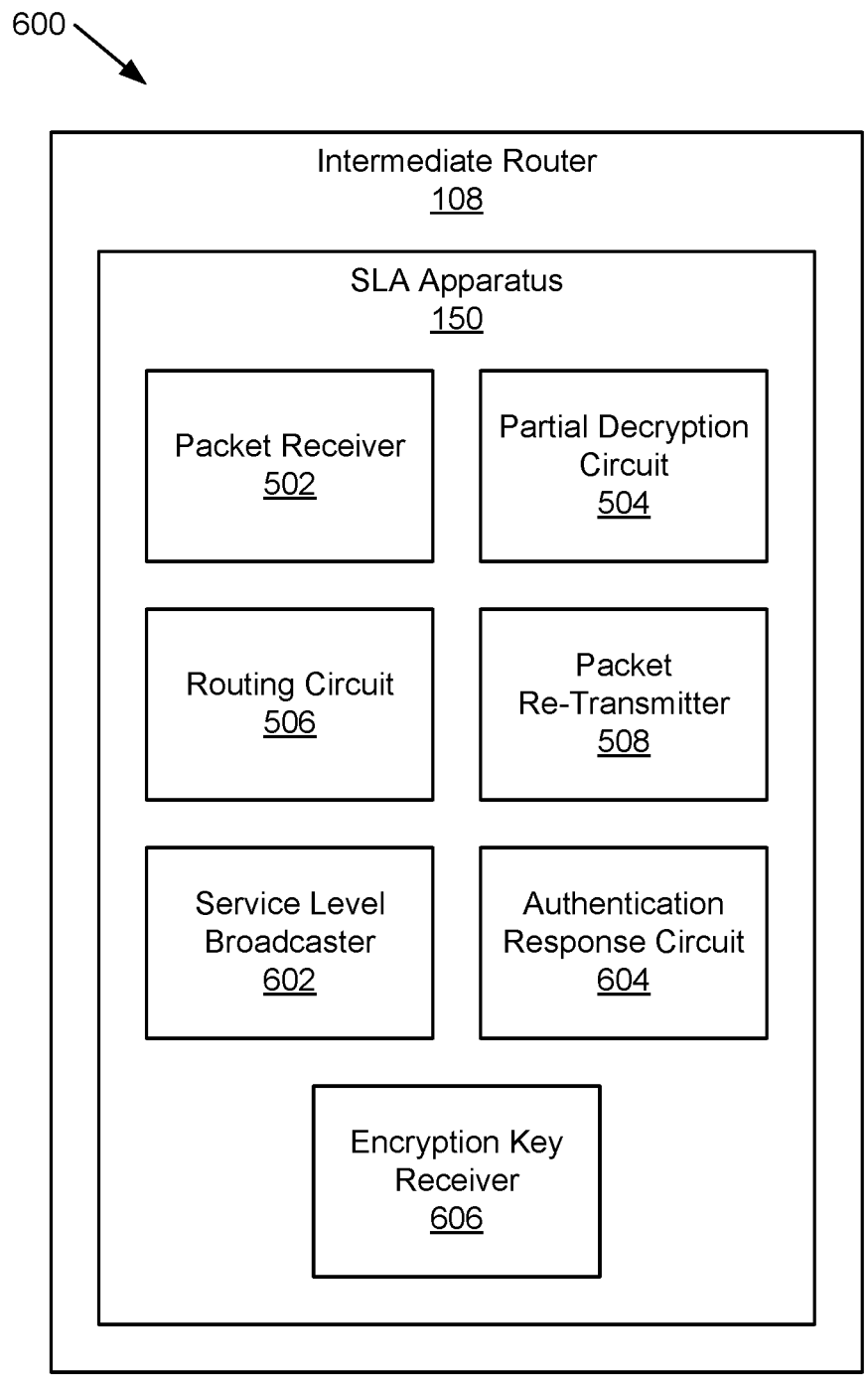
FIG. 6 is a schematic block diagram illustrating another embodiment of an apparatus for receiving an encrypted packet at an intermediate router, decrypting a portion of the encrypted data packet based on a service level agreement and transmitting the encrypted data packet based on priority determined from the decrypted portions of the data packet.

FIG. 6 is a schematic block diagram illustrating another embodiment of an apparatus 600 for receiving an encrypted packet at an intermediate router 108, decrypting a portion of the encrypted data packet based on an SLA and transmitting the encrypted data packet based on priority determined from the decrypted portions of the data packet. The apparatus 600 includes another embodiment of the packet decryption apparatus 150, in an intermediate router 108, that includes a packet receiver 502, a partial decryption circuit 504, a routing circuit 506 and a packet re-transmitter 508, which are substantially similar to those described above in relation to the apparatus 500 of FIG. 5. The apparatus 600, in various embodiments, includes a service level broadcaster 602, an authentication response circuit 604 and/or an encryption key receiver 606, which are described below.

The apparatus 600, in some embodiments, includes a service level broadcaster 602 configured to broadcast, from the intermediate router 108, the SLA of the intermediate router 108 to the source router 104 from which the intermediate router 108 received the one or more encryption keys. In some embodiments, the service level broadcaster 602 broadcasts the SLA of the intermediate router 108 to various routers and switches in the network 100. In other embodiments, the service level broadcaster 602 broadcasts the SLA upon connection to the network 100. In other embodiments, the service level broadcaster 602 broadcasts identity information for the intermediate router 108 along with the SLA. In embodiments without the service level broadcaster 602, the apparatus 600 may receive a request from the source router 104 for information about the intermediate router 108 and/or the SLA.

In some embodiments, the apparatus 600 includes an authentication response circuit 604 that responds to an authentication request from the source router 104. For example, the source router 104 may require authentication of the intermediate router 108 before transmitting encryption keys. The authentication response circuit 604 may respond with a digital certificate, a public key, or other information known to those of skill in the art.

The apparatus 600, in some embodiments, includes an encryption key receiver 606, at the intermediate router 108, configured to receive from the source router 104 one or more encryption keys configured to decrypt one or more layers of an encrypted data packet transmitted from the source router 104. The one or more layers of the encrypted data packet provide information for the intermediate router 108 to read information from the encrypted data packet in compliance with the SLA of the intermediate router 108. For example, where the SLA requires information from layer 3 of an encrypted data packet, the encryption key receiver 606 may receive one or more keys from the source router 104 enabling the partial decryption circuit 504 to decrypt layer 2 and layer 3 of an encrypted data packet. For the embodiment 200 of FIG. 2A, the encryption key receiver 606 may receive a first encryption key k1. For the embodiment 201 of FIG. 2B, the encryption key receiver 606 may receive first and second encryption keys k1, k2. The encryption key receiver 606 typically stores the received encryption keys for use while the SLA is in effect and may receive other encryption keys when there is a change to the SLA.

Figure 7:
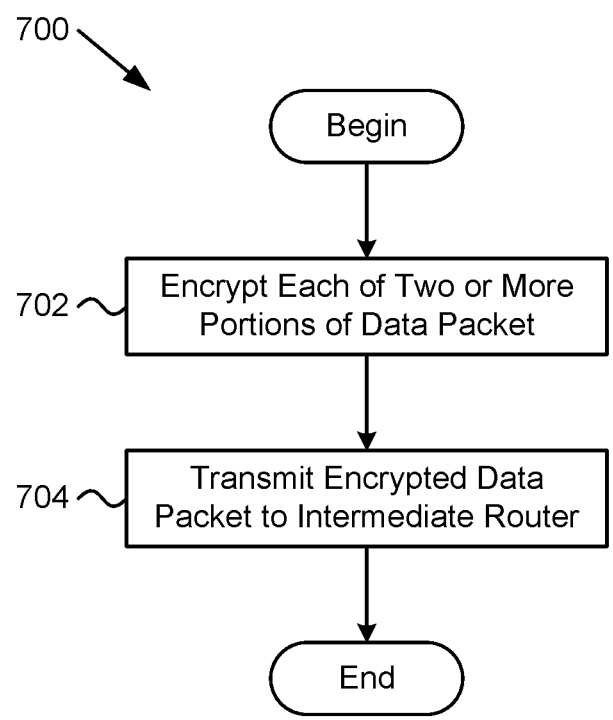
FIG. 7 is a schematic flow chart diagram illustrating one embodiment of a method for encrypting portions of a data packet each with a different encryption key and for transmitting an encrypted data packet to an intermediate router.

FIG. 7 is a schematic flow chart diagram illustrating one embodiment of a method 700 for encrypting portions of a data packet each with a different encryption key and for transmitting an encrypted data packet to an intermediate router 108. The method 700 begins and encrypts 702, using a plurality of encryption keys, each of two or more portions of a data packet. Each portion is encrypted with a different encryption key of the plurality of encryption keys and each portion includes one or more layers of the data packet and a last portion includes at least a payload of the data packet. A first portion of the two or more portions includes a layer of the data packet with MAC information.

The method 700 transmits 704, from a source router 104, an encrypted data packet to an intermediate router 108 between the source router 104 and a destination router 110, and the method 700 ends. The encrypted data packet includes an encrypted version of the data packet encrypted using the plurality of encryption keys. For the method 700, the intermediate router 108 has one or more of the plurality of encryption keys sufficient for a service level agreement of the intermediate router 108 and lacks a portion of the plurality of encryption keys. In addition, the source and destination routers 104, 110 use a MAC security standard for encryption and decryption of the data packet using the plurality of encryption keys. In various embodiments, all or a portion of the method 700 is implemented using the packet encryption circuit 302 and/or the packet transmitter 304.

Figure 8:
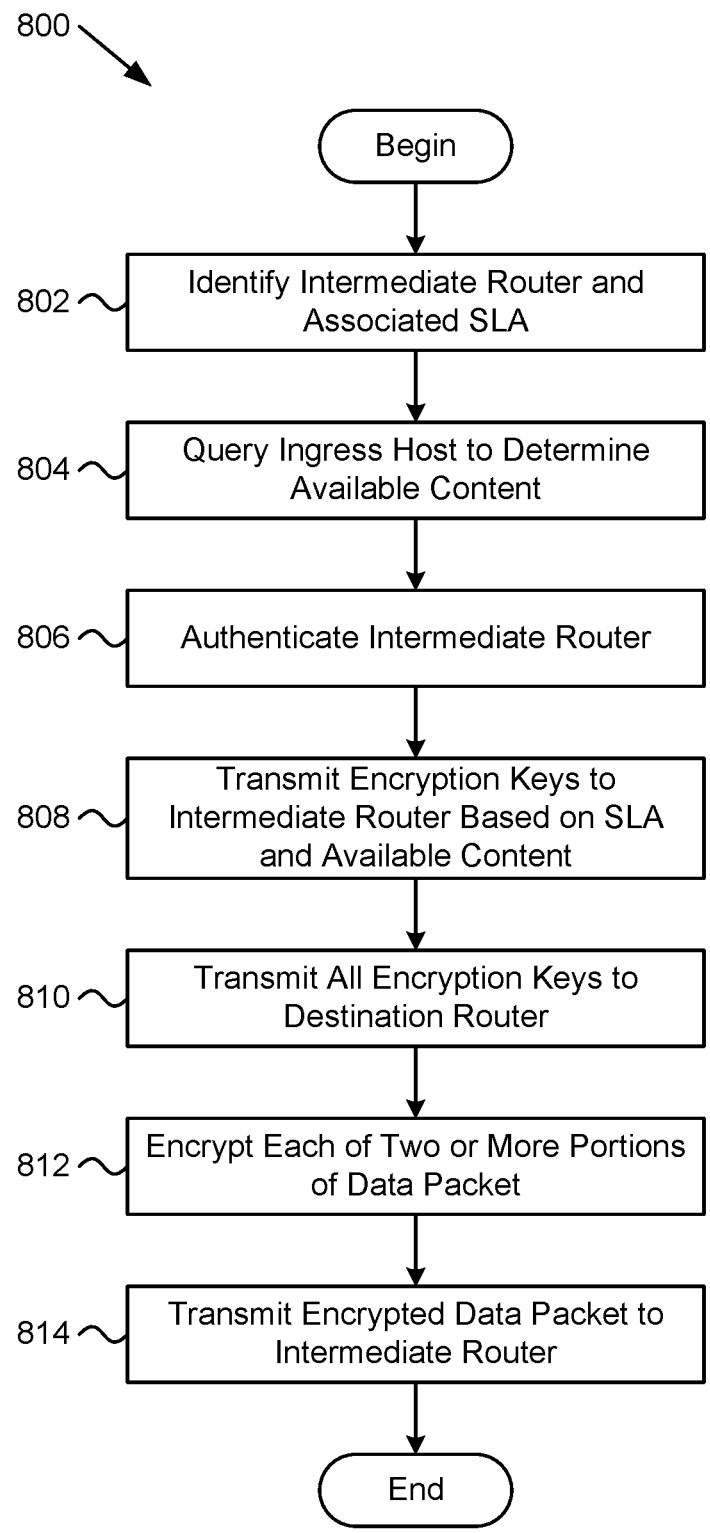
FIG. 8 is a schematic flow chart diagram illustrating another embodiment of a method for encrypting portions of a data packet each with a different encryption key and for transmitting an encrypted data packet to an intermediate router.

FIG. 8 is a schematic flow chart diagram illustrating another embodiment of a method 800 for encrypting portions of a data packet each with a different encryption key and for transmitting an encrypted data packet to an intermediate router 108. The method 800 begins and identifies 802 an intermediate router 108 between the source and destination routers 104, 110 and identifies the service level agreement of the intermediate router 108. The method 800 queries 804 an ingress host 106 transmitting the data packet to determine one or more types of content available to be transmitted by the ingress host 106 and using the one or more types of content available to be transmitted by the ingress host 106 and the service level agreement of the intermediate router 108 to determine which encryption keys to transmit to the intermediate router 108.

The method 800 authenticates 806 the intermediate router 108 and transmits 808 one or more encryptions keys to the intermediate router 108 corresponding to one or more layers of the data packet sufficient for the service level agreement of the intermediate router 108 and does not transmit encryption keys to the intermediate router 108 for layers of the data packet beyond layers sufficient for the service level agreement of the intermediate router 108. The method 800 transmits 810 the plurality of encryption keys to the destination router 110.

The method 800 encrypts 812, using a plurality of encryption keys, each of two or more portions of a data packet received from the ingress host 106. Each portion is encrypted with a different encryption key of the plurality of encryption keys and each portion includes one or more layers of the data packet and a last portion includes at least a payload of the data packet. A first portion of the two or more portions includes a layer of the data packet with MAC information. The method 800 transmits 84, from the source router 104, an encrypted data packet to an intermediate router 108 between the source router 104 and a destination router 110, and the method 800 ends. The encrypted data packet includes an encrypted version of the data packet encrypted using the plurality of encryption keys. The source and destination routers 104, 110 use a MAC security standard for encryption and decryption of the data packet using the plurality of encryption keys. In various embodiments, all or a portion of the method 800 is implemented using the packet encryption circuit 302, the packet transmitter 304, the service discovery circuit 402, the authenticator 404 and/or the encryption key transmitter 406.

Figure 9:
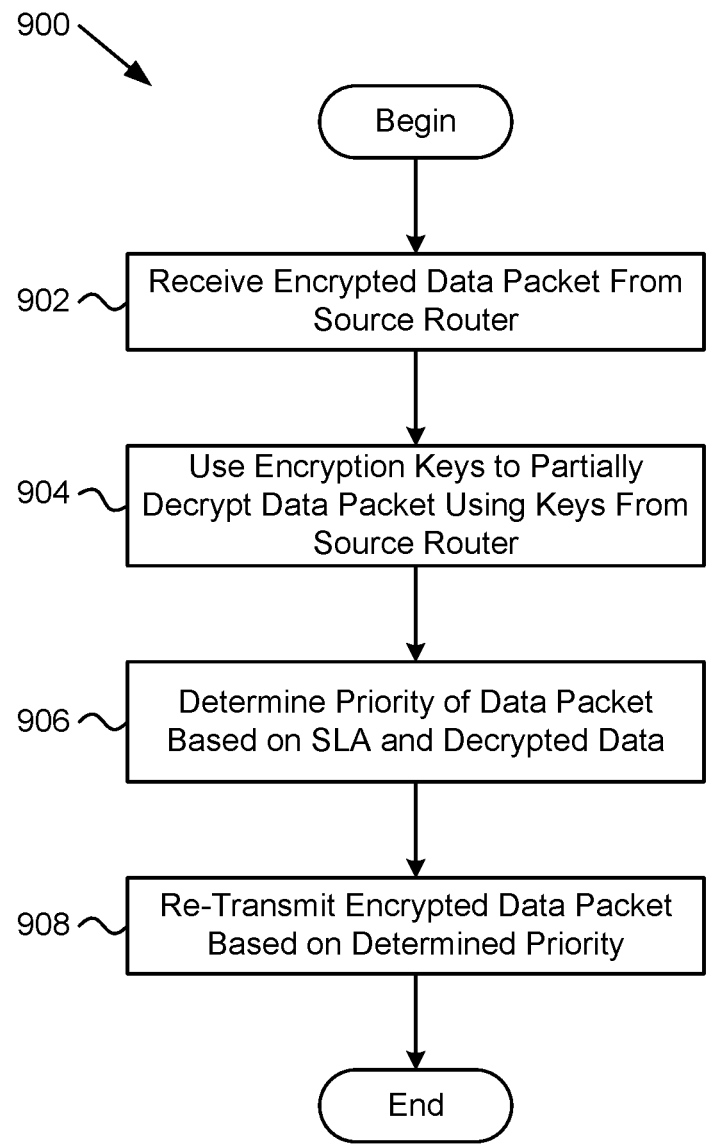
FIG. 9 is a schematic flow chart diagram illustrating one embodiment of a method for receiving an encrypted packet at an intermediate router, decrypting a portion of the encrypted data packet based on a service level agreement and transmitting the encrypted data packet based on priority determined from the decrypted portions of the data packet.

FIG. 9 is a schematic flow chart diagram illustrating one embodiment of a method 900 for receiving an encrypted packet at an intermediate router 108, decrypting a portion of the encrypted data packet based on a service level agreement and transmitting the encrypted data packet based on priority determined from the decrypted portions of the data packet. The method 900 begins and receives 902, at an intermediate router 108, an encrypted data packet being transmitted from a source router 104 to a destination router 110. The source and destination routers 104, 110 use a MAC security standard for encryption and decryption of the data packet. The method 900 uses 904 one or more encryption keys received from the source router 104 to decrypt one or more layers of the encrypted data packet while leaving one or more additional lower layers and a payload of the encrypted data packet encrypted. The decrypted layers include information to process the encrypted data packet according to a service level agreement of the intermediate router 108.

The method 900 determines 906 a priority of the encrypted data packet based on the service level agreement and the information of the decrypted layers and re-transmits 908 a version of the encrypted data packet in accordance with the determined priority of the encrypted data packet and the service level agreement of the intermediate router 108 where the version of the encrypted data packet matches the received encrypted data packet, and the method 900 ends. In various embodiments, all or a portion of the method 900 is implemented using the packet receiver 502, the partial decryption circuit 504, the routing circuit 506 and/or the packet re-transmitter 508.

Figure 10:
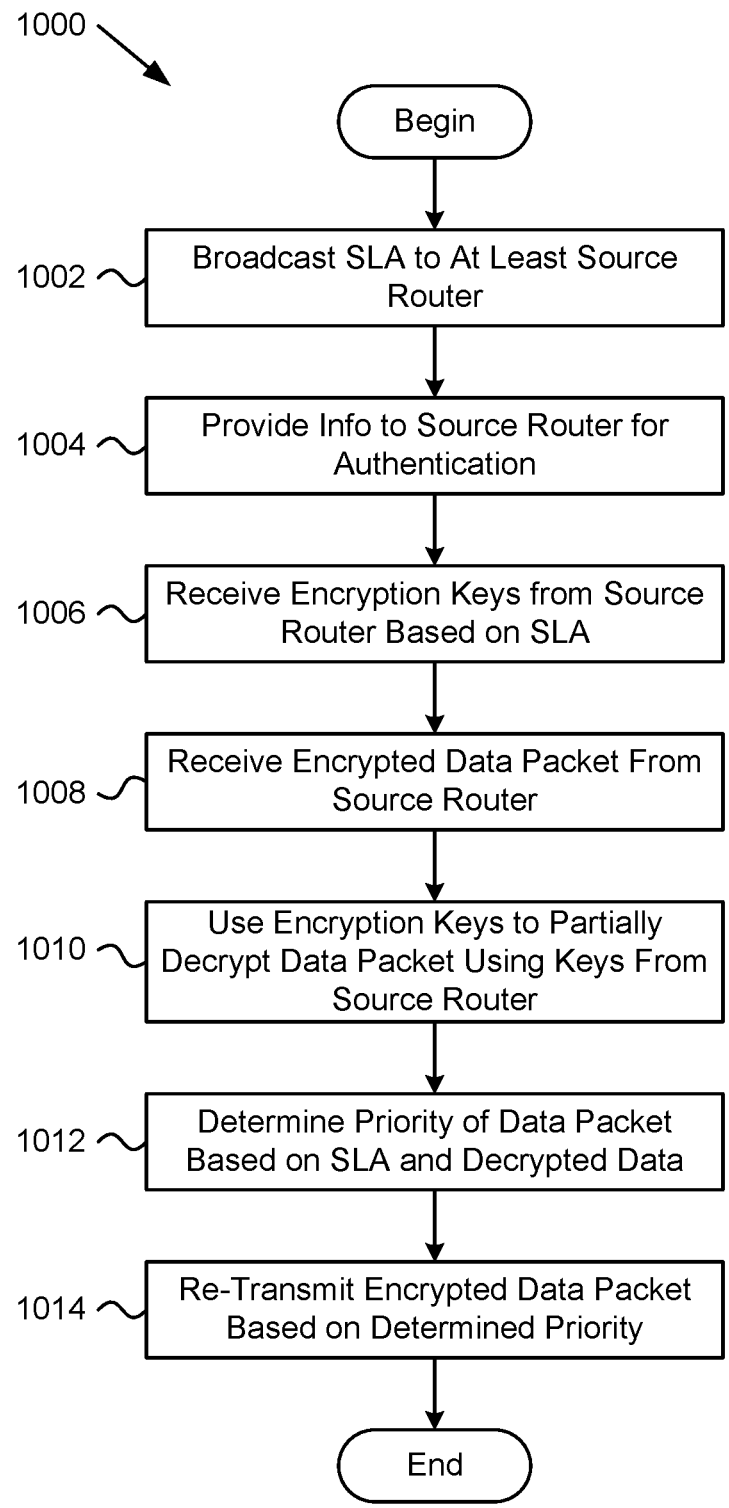
FIG. 10 is a schematic flow chart diagram illustrating another embodiment of a method for receiving an encrypted packet at an intermediate router, decrypting a portion of the encrypted data packet based on a service level agreement and transmitting the encrypted data packet based on priority determined from the decrypted portions of the data packet.

FIG. 10 is a schematic flow chart diagram illustrating another embodiment of a method 1000 for receiving an encrypted packet at an intermediate router 108, decrypting a portion of the encrypted data packet based on a service level agreement and transmitting the encrypted data packet based on priority determined from the decrypted portions of the data packet. The method 1000 begins and broadcasts 1002, from an intermediate router 108, a service level agreement of the intermediate router 108 to the source router 104 from which the intermediate router 108 receives encrypted data packets being transmitted to a destination router 110. The method 1000 provides 1004, from the intermediate routers 108, information to the source router 104 for authentication of the intermediate router 108 to the source router 104. The method 1000 receives 1006, at the intermediate router 108, from the source router 104 one or more encryption keys configured to decrypt one or more layers of an encrypted data packet transmitted from the source router 104. The one or more layers of the encrypted data packet provide information for the intermediate router 108 to read information from the encrypted data packet in compliance with the service level agreement of the intermediate router 108.

The method 1000 receives 1008, in the intermediate router 108, an encrypted data packet being transmitted from the source router 104 to the destination router 110. The source and destination routers 104, 110 use a MAC security standard for encryption and decryption of the data packet. The method 1000 uses 1010 one or more encryption keys received from the source router 104 to decrypt one or more layers of the encrypted data packet while leaving one or more additional lower layers and a payload of the encrypted data packet encrypted. The decrypted layers include information to process the encrypted data packet according to a service level agreement of the intermediate router 108.

The method 1000 determines 1012 a priority of the encrypted data packet based on the service level agreement and the information of the decrypted layers and re-transmits 1014 a version of the encrypted data packet in accordance with the determined priority of the encrypted data packet and the service level agreement of the intermediate router 108 where the version of the encrypted data packet matches the received encrypted data packet, and the method 1000 ends. In various embodiments, all or a portion of the method 1000 is implemented using the packet receiver 502, the partial decryption circuit 504, the routing circuit 506, the packet re-transmitter 508, the service level broadcaster 602, the authentication response circuit 604 and/or the encryption key receiver 606.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a packet encryption circuit configured to use a plurality of encryption keys to encrypt each of two or more portions of a data packet, each portion encrypted with a different encryption key of the plurality of encryption keys, each portion comprises one or more layers of the data packet and a last portion comprises at least a payload of the data packet, a first portion of the two or more portions comprises a layer of the data packet comprising Media Access Control ("MAC") information; and
    a packet transmitter configured to transmit, from a source router, an encrypted data packet to an intermediate router between the source router and a destination router, the encrypted data packet comprising an encrypted version of the data packet encrypted using the plurality of encryption keys,
    wherein the intermediate router has one or more of the plurality of encryption keys sufficient for decrypting a portion of a data packet to determine priority of the data packet based on a service level agreement of the intermediate router and lacks a portion of the plurality of encryption keys for decrypting other portions of the data packet, and
    wherein the source and destination routers use a MAC security standard ("MACSec") for encryption and decryption of the data packet using the plurality of encryption keys.

2. The apparatus of claim 1, wherein each of the two or more portions correspond to a single layer of the data packet, the last portion comprising at least the payload and one or more layers of the data packet.

3. The apparatus of claim 1, further comprising:
a service discovery circuit that identifies the intermediate router between the source and destination routers and identifies the service level agreement of the intermediate router; and
an encryption key transmitter that transmits one or more encryptions keys to the intermediate router corresponding to one or more layers of the data packet sufficient for the service level agreement of the intermediate router and wherein the encryption key transmitter does not transmit encryption keys to the intermediate router for layers of the data packet beyond layers sufficient for the service level agreement of the intermediate router.

4. The apparatus of claim 3, wherein:
the service discovery circuit identifies two or more intermediate routers between the source and destination routers and a requested service level agreement of each of the two or more intermediate routers; and
for each of the two or more intermediate routers, the encryption key transmitter transmits one or more encryptions keys to the intermediate router corresponding to one or more layers of the data packet sufficient for the service level agreement of the intermediate router and wherein the encryption key transmitter does not transmit encryption keys to the intermediate router for layers of the encrypted data packet beyond layers sufficient for the service level agreement of the intermediate router.

5. The apparatus of claim 4, wherein at least two of the two or more intermediate routers have different service level agreements.

6. The apparatus of claim 3, wherein the service discovery circuit queries an ingress host transmitting the data packet to determine one or more types of content available to be transmitted by the ingress host and the encryption key transmitter uses the one or more types of content available to be transmitted by the ingress host and the service level agreement of the intermediate router to determine which encryption keys to transmit to the intermediate router.

7. The apparatus of claim 3, wherein the encryption key transmitter circuit transmits the plurality of encryption keys to the destination router.

8. The apparatus of claim 1, wherein the MACSec is the Institute of Electrical and Electronics Engineers ("IEEE") 802.1AE standard.

9. The apparatus of claim 1, wherein the data packet comprises a layer 2, a layer 3, a transport layer and one or more application context layers and wherein:
the packet encryption circuit encrypts layer 2 with a first encryption key;
the packet encryption circuit encrypts the layer 3 with a second encryption key;
the packet encryption circuit encrypts the transport layer with a third encryption key; and
the packet encryption circuit encrypts the one or more application context layers each with a separate encryption key.

10. An apparatus comprising
a packet receiver, in an intermediate router, configured to receive an encrypted data packet being transmitted from a source router to a destination router, the source and destination routers use a Media Access Control security standard ("MACSec") for encryption and decryption of the data packet;
a partial decryption circuit configured to use one or more encryption keys received from the source router to decrypt one or more layers of the encrypted data packet while leaving one or more additional lower layers and a payload of the encrypted data packet encrypted, wherein the decrypted layers comprise information to process the encrypted data packet according to a service level agreement of the intermediate router;
a routing circuit configured to determine a priority of the encrypted data packet based on the service level agreement and the information of the decrypted layers; and
a packet re-transmitter configured to transmit a version of the encrypted data packet in accordance with the determined priority of the encrypted data packet and the service level agreement of the intermediate router, unencrypted contents of the version of the encrypted data packet matching unencrypted contents of the encrypted data packet received by the packet receiver.

11. The apparatus of claim 10, further comprising a service level broadcaster configured to broadcast, from the intermediate router, the service level agreement of the intermediate router to the source router from which the intermediate router received the one or more encryption keys.

12. The apparatus of claim 11, further comprising an encryption key receiver, at the intermediate router, configured to receive from the source router one or more encryption keys configured to decrypt one or more layers of the encrypted data packet transmitted from the source router, the one or more layers of the encrypted data packet providing information for the intermediate router to read information from the encrypted data packet in compliance with the service level agreement of the intermediate router.

13. The apparatus of claim 10, wherein the MACSec is the Institute of Electrical and Electronics Engineers ("IEEE") 802.1AE standard.

14. The apparatus of claim 10, wherein the intermediate router does not use the MACSec and is not authorized to decrypt layers of the encrypted data packet beyond the one or more layers corresponding to the one or more encryption keys received from the source router.

15. A method comprising:
using a plurality of encryption keys to encrypt each of two or more portions of a data packet, each portion encrypted with a different encryption key of the plurality of encryption keys, each portion comprises one or more layers of the data packet and a last portion comprises at least a payload of the data packet, a first portion of the two or more portions comprises a layer of the data packet comprising Media Access Control ("MAC") information; and
transmitting, from a source router, an encrypted data packet to an intermediate router between the source router and a destination router, the encrypted data packet comprising an encrypted version of the data packet encrypted using the plurality of encryption keys,
wherein the intermediate router has one or more of the plurality of encryption keys sufficient for decrypting a portion of a data packet to determine priority of the data packet based on a service level agreement of the intermediate router and lacks a portion of the plurality of encryption keys for decrypting other portions of the data packet, and
wherein the source and destination routers use a MAC security standard ("MACSec") for encryption and decryption of the data packet using the plurality of encryption keys.

16. The method of claim 15, wherein each of the two or more portions correspond to a single layer of the data packet, the last portion comprising at least the payload and one or more layers of the data packet.

17. The method of claim 15, further comprising:
identifying the intermediate router between the source and destination routers and identifying the service level agreement of the intermediate router; and
transmitting one or more encryptions keys to the intermediate router corresponding to one or more layers of the data packet sufficient for the service level agreement of the intermediate router and not transmitting encryption keys to the intermediate router for layers of the data packet beyond layers sufficient for the service level agreement of the intermediate router.

18. The method of claim 17, wherein identifying the intermediate router between the source and destination routers and identifying the requested service level agreement of the intermediate router comprises identifying two or more intermediate routers between the source and destination routers and identifying a requested service level agreement of each of the two or more intermediate routers and further comprising, for each of the two or more intermediate routers, transmitting one or more encryptions keys to the intermediate router corresponding to one or more layers of the data packet sufficient for the service level agreement of the intermediate router and not transmitting encryption keys to the intermediate router for layers of the data packet beyond layers sufficient for the service level agreement of the intermediate router.

19. The method of claim 17, further comprising querying an ingress host transmitting the data packet to determine one or more types of content available to be transmitted by the ingress host and using the one or more types of content available to be transmitted by the ingress host and the service level agreement of the intermediate router to determine which encryption keys to transmit to the intermediate router.

20. The method of claim 15, further comprising transmitting the plurality of encryption keys to the destination router.

* * * * *